United States Patent [19]

Saida

[11] Patent Number: 4,577,742

[45] Date of Patent: Mar. 25, 1986

[54] CLUTCH DISC

[75] Inventor: Chiaki Saida, Tokoname, Japan

[73] Assignee: Aisin Seiki Kabushiki Kaisha, Kariya, Japan

[21] Appl. No.: 487,681

[22] Filed: Apr. 22, 1983

[30] Foreign Application Priority Data

Apr. 27, 1982 [JP] Japan .................................. 57-70684
May 21, 1982 [JP] Japan .................................. 57-84926

[51] Int. Cl.$^4$ ............................................. F16D 3/14
[52] U.S. Cl. .................................... 192/106.2; 464/64; 464/68
[58] Field of Search ............... 192/70.17, 106.2, 106.1; 464/64, 66, 67, 68

[56] References Cited

U.S. PATENT DOCUMENTS

| | | | |
|---|---|---|---|
| 3,101,600 | 8/1963 | Stromberg | 464/68 |
| 3,800,931 | 4/1974 | Maucher | 192/70.17 |
| 3,931,876 | 1/1976 | Beeskow et al. | 192/106.2 |
| 3,983,982 | 10/1976 | Worner | 192/106.2 |
| 4,036,341 | 7/1977 | Beeskow et al. | 192/106.2 |
| 4,239,097 | 12/1980 | Greacen et al. | |
| 4,433,770 | 2/1984 | Loizeau et al. | 192/106.2 |
| 4,470,494 | 9/1984 | Takeuchi | 192/70.17 |
| 4,494,642 | 1/1985 | Hashimoto | 192/106.2 |

FOREIGN PATENT DOCUMENTS

| | | |
|---|---|---|
| 1425208 | 11/1963 | Fed. Rep. of Germany . |
| 1801969 | 11/1970 | Fed. Rep. of Germany . |
| 3133728 | 8/1980 | Fed. Rep. of Germany . |
| 3138943 | 9/1980 | Fed. Rep. of Germany . |
| 3205039 | 2/1981 | Fed. Rep. of Germany . |
| 3206068 | 2/1981 | Fed. Rep. of Germany . |
| 2458710 | 6/1980 | France . |
| 2049101 | 4/1980 | United Kingdom . |

Primary Examiner—Rodney H. Bonck
Assistant Examiner—Alan G. Towner
Attorney, Agent, or Firm—Burns, Doane, Swecker and Mathis

[57] ABSTRACT

A clutch disc is described of the type having inner and outer flanged hub plates, the outer hub plate coming into rotating engagement with a disc plate through damping springs and friction elements, inner and outer flange portions of said plates mounted to be relatively rotatable by a given angle; at least one plate fixed to one of the inner and outer flange portions so as to limit the axial relative movement therebetween; first damping springs between the inner and outer flange portions through the fixed plate designed to be resiliently compressed during relative angular displacement between the flange portions; a first friction element disposed between the fixed plate and one of the inner and outer flange portions; at lest one disc plate relatively rotatable with respect to the outer flange portion and provided with a facing member on its outer periphery; second and third damping springs between the fixed plate and the outer flange portion designed to be resiliently compressed during relative angular displacement between the disc plate and the outer flange portion; second and third friction elements arranged between the fixed plate and the disc plate; and acting between the outer flange portion and the disc plate. A control plate for determinating the point of commencement of action of the third friction elements, and a resilient control spring for controlling the control plate may also be provided.

13 Claims, 18 Drawing Figures

FIG. 4
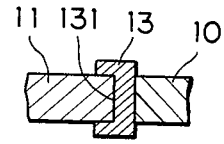
FIG.5a  FIG.5b
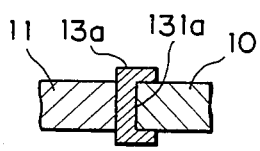 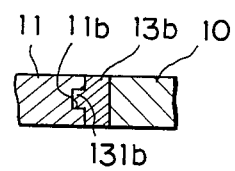
FIG.5c  FIG.5d  FIG.5e
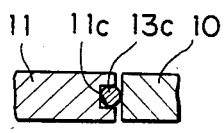 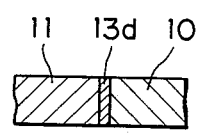 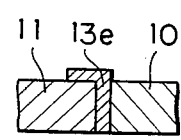
FIG.5f  FIG.5g  FIG.5h
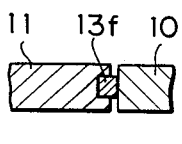 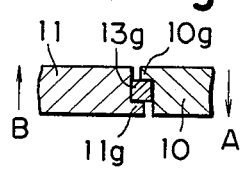 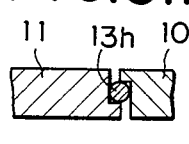

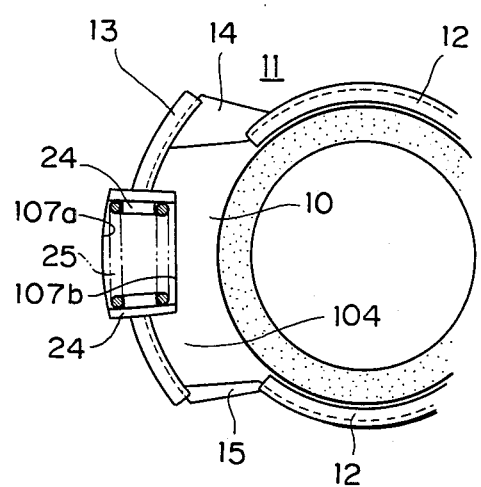

CLUTCH DISC

FIELD OF THE INVENTION

The present invention relates to a clutch disc having its clutch hub divided into a first clutch hub portion and a second clutch hub portion.

BACKGROUND

Generally, a clutch disc arrangement of the type having a first and a second clutch hub portions, a suitable clearance is only allowed between both clutch hub portions without provision of any separate member to be interposed therebetween. While the arrangement has been used for extended periods of time, this incurs wearing and rusting of the sliding portions between both clutch hub portions, and possibly gives rise to desired hysteresis in the "angle of torsion-torque" curve, these being counted as drawbacks. When the contact areas of the sliding portions are reduced to decrease the magnitude of the hysteresis, they are apt to wear away due to high contact pressures, which is also counted as a drawback.

This type of clutch disc may generally be of the following structure, i.e., designed to make rotating engagement between a hub flange of a clutch hub and a disc plate through damping means and friction means (elements). The hub flange comprises an inner flange portion (first hub portion) and an outer flange portion (second hub portion) disposed to be rotatable by a given angle relative to the inner flange and with an angular clearance in the rotating direction. The inner flange portion is engaged with the outer flange portion through damping means (damping springs) in damping relation for relative rotation. A first friction member is disposed operatively between the inner and outer flange portions for acting on both portions, and the outer flange portion is engaged with the disc plate through damping means and friction means having varied characteristics in such a manner that any rotational shocks are damped or absorbed. At least one damping means is arranged in one of windows and/or notches (hereinafter referred to as "window/notches" formed in any one of the outer flange portion and the disc plate, and intended to be engageable within the other corresponding one of circumferentially larger window/notches provided in the other of the outer flange portion and the disc plate.

This type of clutch is called the two-divided hub type wherein, within the limits of an angular clearance allowed between the inner and outer flange portions, torque is transmitted from the inner flange to the outer flange through damping means (springs) disposed between the inner and outer flange portions. However, once the engagement of both flange portions is achieved, a plurality of springs disposed therearound work additionally in a successive manner, so that the torque is transmitted to the portion of the clutch disc having friction linings in a damping manner. In this type of clutch, it constitutes a first-range changeover point of hysteresis width when the engagement of the inner and outer flange portions is achieved. In the prior art, second, third and further-range changeover of hysteresis width is effected by means of a control plate, which works (i.e., cause changeover of hysteresis width) in operative correspondence with the commencement of action of damping means (first, second, third ... damping springs) that are disposed in the mutually associated window/notches provided in the outer flange portion and the disc plate to take part in damping transmission of torque for the second, third and further-stage (torque stage).

On the other hand, it is desired to vary the magnitude of hysteresis width in the torque stages corresponding to low, moderate and high speed ranges, if required, with a view to reducing or eleminating various sorts of noises that the driving system generates. These noises practically include so-called transmission rattle noise generated when the tooth surfaces of two gears meshing with each other based on back lash collide with each other due to variation of the engine revolutional speed at the neutral state of transmission, so-called differential tapping noise, viz., back lash noise generated from differential gears during running and starting, and so-called booming or humming noise generated during constant or accelerated running (considered to be generated from the overall driving system), etc.

In the prior art, however, since the width of hysteresis at the respective stages is determined in operative association with the operation of the respective springs operable at the respective stages set up according to the requirements for the torque transmission curve, it has been difficult to determine the width of hysteresis independently of such determination, i.e., from a different point-of-view. In particular, the width of hysteresis at the second and third ranges should be determined independently of the changeover points of torque stages on the torque transmission curve so as to reduce or eliminate various sorts of noises.

SUMMARY OF THE DISCLOSURE

A principal object of the present invention is to provide a novel compact clutch disc.

Another object of the present invention is to smooth further the relative movement between the first and second clutch hub portions, thereby preventing the occurrence of unnecessary hysteresis.

A further object of the present invention is to eliminate the disadvantages of the prior art by constructing a small-sized clutch disc without incurring any structural complexity.

A yet further object of the present invention is to provide a clutch disc of the above-mentioned two-divided hub tape wherein the width of hysteresis can be set up at any desired angular position to permit easy removal of various noises.

Other objects and features of the present invention will be understood from the overall disclosure given herein and the drawings attached hereto.

More specifically, the present invention provides a novel clutch disc in which a clutch hub having a hub flange comes into rotating engagement with a disc plate through damping means and friction means including:

said hub flange comprising an inner flange portion and an outer flange portion mounted to be relatively rotatable by a given angle with respect to said inner flange portion and with an angular clearance;

at least one plate fixed to either one of said inner and outer flange portions so as to limit the axial relative movement between said inner and outer flange portions;

first damping means arranged operatively between said inner and outer flange portions through said fixed plate and designed to be resiliently compressed during relative angular displacement between said inner and outer flange portions;

a first friction means disposed between said fixed plate and another one of said inner and outer flange portions operatively associate with between said inner and outer flange portions;

at least one disc plate adapted to be relatively rotatable with respect to said outer flange portion and provided with a facing member on its outer periphery;

second or further damping means arranged operatively between said fixed plate and said outer flange portion, said second or further damping means being designed to be resiliently compressed during relative angular displacement between said disc plate and said outer flange portion; and second or further friction means arranged between said outer flange portion and said disc plate ard acting therebetween.

While the present invention will now be explained with reference to the drawings showing preferred embodiment thereof, it will be understood that the present invention is not limited thereto, and many modifications and changes may be made within the scope and concept of the present invention.

BRIEF DESCRIPTION OF THE DRAWINGS

FIG. 4 is an enlarged sectional view taken along the line IV—IV of FIG. 1, FIGS. 5a-5h are enlarged sectional views similar to FIG. 4, showing variations of an intermediate member, FIG. 6 is partially sectional view showing a modified embodiment of FIG. 1.

DETAILED DESCRIPTION OF THE PREFERRED EMBODIMENTS

Figure 1:
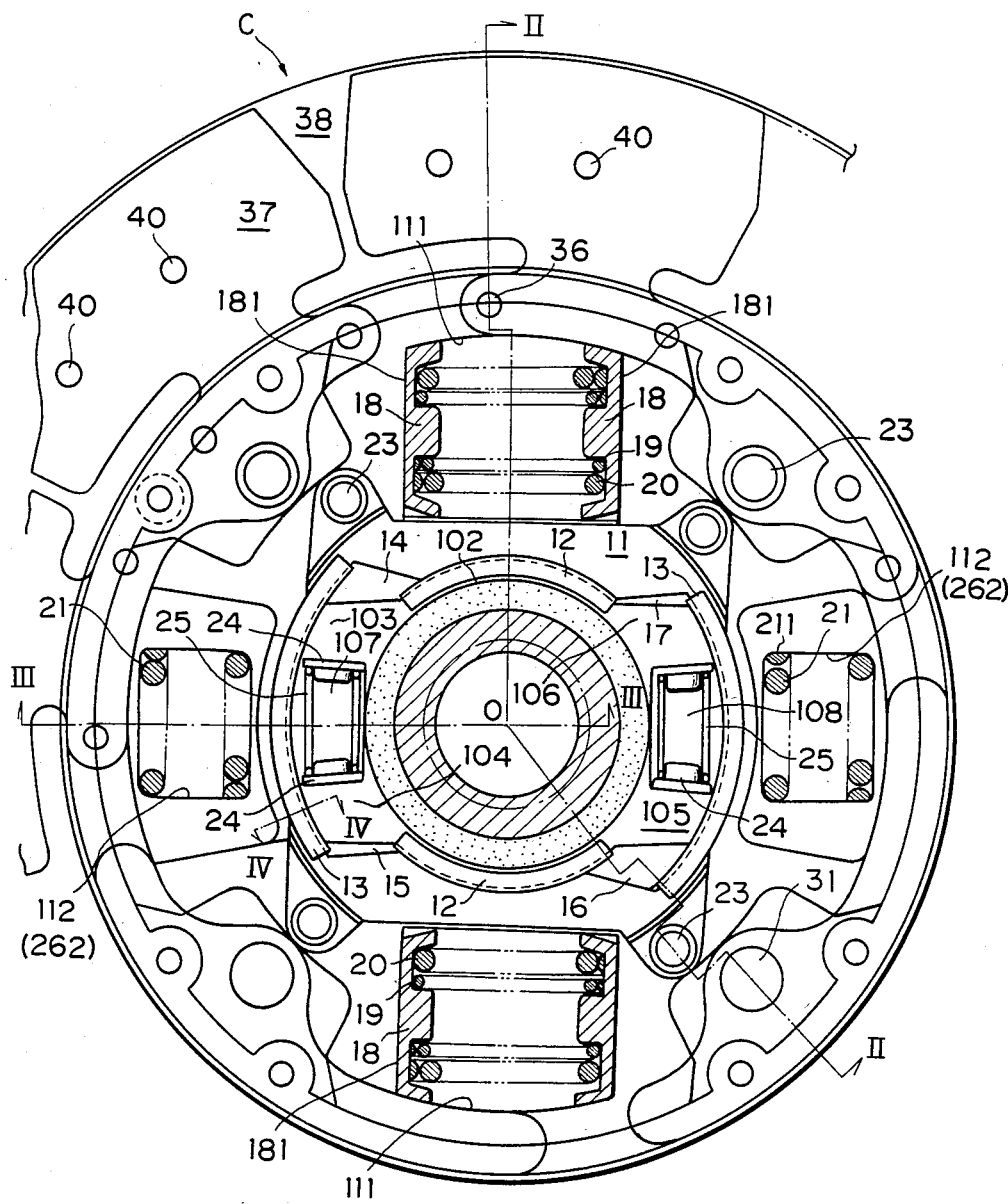
FIG. 1 is a front view, partially sectioned, of the clutch C according to one embodiment of the present invention a sectional view taken along the line I—I of FIG. 2)

One preferred embodiment of the present invention includes an intermediate member disposed between the inner and outer flange portions (the first and second hub portions) so as to smooth the relative movement therebetween.

Due to the interposition of the intermediate member between the first and second hub portions secures smooth relative rotation with each other thereby preventing unnecessary or undesired histeresis in the angle of torsion-torque curve. Yet more, a preferred embodiment of the section form wherein both hub portions engage with each other by means of the intermediate member permits to prevent axial displacement between both hub portions. In case where a damper member (damping means) is retained by means of a plurality of radial projections provided at the periphery of the first hub portion and the intermediate number, friction wear and rust can be prevented due to friction properties, i.e., fracture of the damper member due to wear can be restrained, whereas such friction wear between the window edge and the damper members and rust are likely to occur so long as the damper members are retained only by means of windows provided in the hub portion.

According to the preferred embodiment of the present invention, the clutch disc comprises a first hub portion to be fitted on a rotating shaft; a second hub portion disposed around the outer periphery of said first hub portion; a plurality of windows or notches (window/notches) formed in said second hub portion, each of said windows having therein a first damper member; an intermediate member disposed between said first and second hub portions to smooth the relative movement of both hub portions, said intermediate member being formed of resinous or metallic materials providing a low coefficient of friction or other materials subjected to surface treatment in such a manner that they acquire a low coefficient of friction; a pair of fixed plates disposed on both sides of said intermediate member with its outer periphery being fixed to said second hub portion; a second damper member arranged between both hub portions and adapted to have its end compressed by said fixed plate during the relative movement of both hub portions; a disc plate provided with a facing on its outer periphery and with windows in its positions corresponding to said windows in said second hub portion; a subplate (i.e., a counterpart of the disc plate) disposed on the side of said intermediate member opposite to said disc plate and provided with windows in its positions corresponding to said windows in said second hub portion; a stopper pin for joining said subplate to said disc plate; and a spring member disposed on both sides of a flange portion of said first hub portion and arranged between said subplate and a thrust plate, said spring member being adapted to bias a first friction plate clamped between said fixed plates and a second friction plate arranged outside of said both fixed plates into abutment onto said disc plate and said thrust plate.

The present invention will now be further elucidated with reference to the first embodiment thereof illustrated in the accompanying drawings.

Referring to FIG. 1 to 4 showing a clutch disc C according to one embodiment of the present invention, a first hub portion 10 is splined at its center, as shown at 101, and rotatable in unison with a rotating shaft (not shown) which engages within the spline 101. A flange portion 102 radially extends from the hub portion 10. Furthermore, four projections 103-106 radially extend from the hub portion 10. Between the projections 103 and 104, as well as 105 and 106 there are provided recesses (i.e., window/notches) 107 and 108, respectively. (The term "window/notch" used herein encompasses also such recess).

A second hub portion 11 is mounted around the outside of the first hub portion 10. Between the inner periphery of the second hub portion 11 and the outer periphery of the first hub portion 10, there are engaged intermediate members 12, 13 of a U shape in cross-section, as illustrated in FIG. 1. Each two intermediate members 12 or 13 are arranged each at the mutually opposite positions on the circumference of a given circle. Each intermediate member 12 is grooved at 121 in its inside, while each intermediate member 13 done at 131 in its outside. Within the grooves 121 and 131 engage the outer peripheral end of the flange portion 102 and the inner peripheral end of the second hub portion 11, respectively. Both hub portions 10 and 11 are arranged with four gaps 14–17, so that they are relatively rotatable around an axis 0 until the magnitude of two out of the four gaps 14–17 is reduced to zero. During such relative rotation, the projections 103–106 slide at their outer peripheral ends over the inner peripheries of the intermediate members 13, while the outer peripheries of the intermediate members 12 in engagement with the flange portion 102 slide over the inner periphery of the second hub portion 11.

The second hub portion 11 is provided therein with two windows 111 and two windows 112 different in size from each other. Coil springs 19 and 20 are fitted into the former windows 111 by means of spring seats 18, while another coil springs 21 done into the latter windows 112, not through the intermediary of any spring seat.

Figure 2:
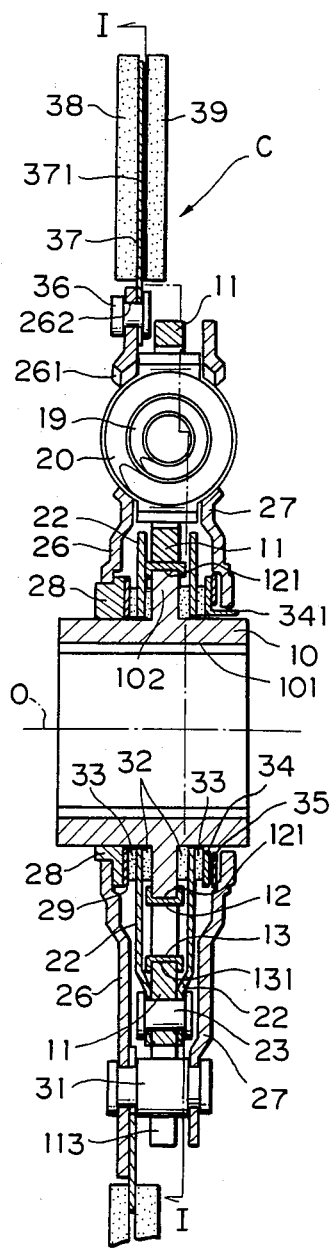
FIG. 2 is a sectional view taken along the line II—O—II of FIG. 1.

As depicted in FIG. 2, fixed plates 22 are mounted on both sides of the intermediate members 12 and 13 by caulking of four fixing pins 23. This assures that the fixed plates 22 are rotatable about the axis 0 in unison with the second hub portion 11.

Figure 3:
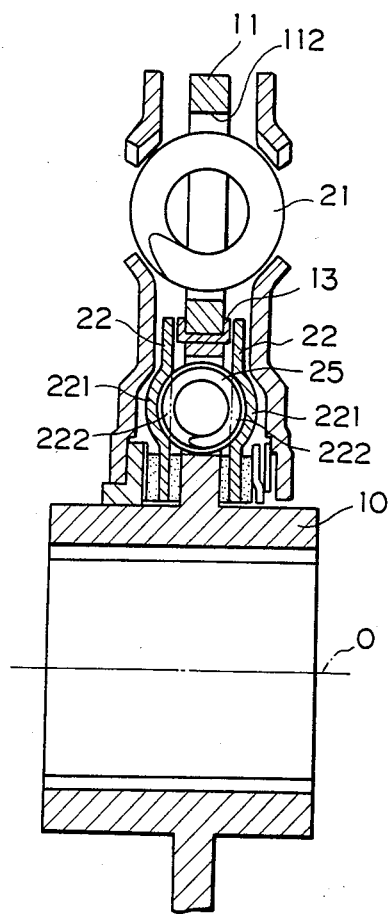
FIG. 3 is an enlarged sectional view taken along the line III—III of FIG. 1.

Within the recesses 107 and 108 defined by the projections 103 and 104 and the projections 105 and 106 extending from the first hub portion 10, two coil springs 25 are mounted through four spring seats 24. As illustrated in FIG. 3, the outer-diameter portion of the spring 25 is enclosed by arched recesses 221 of the fixed plates 22. The arched recesses 221 are provided with ears 222 at the both ends, as viewed vertically with respect to the sheet of FIG. 3. Thus, the both end faces of the spring 25 takes abutment onto the ears 222. With this arrangement, the fixed plates 22 secured to the second hub portion 11 serve to contract the springs 25, when the first and second hub portions 10 and 11 rotate relatively about the axis 0.

As will be appreciated from FIG. 2, a disc plate 26 and therewith associated subplate 27 are arranged on both sides of the coil springs 19, 20 and 21 mounted into the windows 111 and 112 in the second hub portion 11. The disc plate 26 is fixedly applied with a bearing member 28 over its inner periphery. The inner periphery of the bearing member 28 is slidable with respect to the outer periphery of the first hub portion 10, say, they are relatively rotatable around the axis 0. The bearing member 28 is fixedly provided with a ring-like, thin plate 29 on its end face that faces the fixed plate 22.

The disc plate 26 is provided therein with windows 261 and 262 at its positions corresponding to the springs 20 and 21. In the one window 261, an end (not shown) of the disc plate 26 abuts upon the lower end face 181 of the spring seat 18. Likewise, the end face 211 of the spring 21 abuts upon the other window 262. Since the disc plate 26 is fixedly supported with respect to the associated subplate 27 by rivetting of a stopper pin 31, pushes are given to one ends of the springs 19, 20 and similar spring 21 to contract them, when there is relative movement (rotation) between the disc plate 26 and the second hub portion 11 around the axis 0. In this connection, it is noted that caulking of the stopper pin 31 is effected with no fear of its interference with the second hub 11 due to the presence of a notch 113 in the outer periphery thereof.

Friction plates 32 and 33 are mounted on both sides of the inner peripheral end portions of the two fixed plates 22. Outside of the friction plate 33 facing the subplate 27, there is mounted a thrust plate 34 hooked at 341. Further outside of the thrust plate 34, there is mounted a leaf (or possibly corrugated) spring 35 which serves to urge the friction plates 32, 33 and the fixed plates 22 toward the flange portion 102 via the thrust plate 34. The friction plates 32 and 33 positioned on the left side of the flange portion 102 are then urged toward the flange portion 102 under a reaction force resulting from the spring force of the leaf spring 35. This is because the disc plate 26 and the subplate 27 are fixedly held in place by the stopper pin 31.

The disc plate 26 is in the form of a thin plate, and provided with a plurality of small holes 262 in its outer periphery. Rivets 36 are fixedly inserted into these holes 262 by rivetting for fixation of separate ring-like, thin cushion plates 37. The cushion plate 37 has an outer diameter larger than that of the disc plate 26, and is provided on its outer periphery with a corrugated portion 371 serving as a cushion or shock absorber. Ring-shaped clutch facings 38 and 39 are fixedly provided on both sides of the plate 37 by rivetting a plurality of rivets 40, said facings being formed of suitable friction materials.

In the arrangement as described in the foregoing, when rotating torque is transmitted from an engine to the clutch facings 38 and 30 via a fly wheel (not shown), the torque is transmitted in the order of cushion plate 27—disc plate 26, stopper pin 31, subplate 27—spring seat 18—coil springs 19, 20—second hub porton 11—fixed plate 22. The torque is further transmitted to the rotating shaft (not shown) fitted into the spline 101 in the first hub portion 10 via the spring set 24 and coil spring 25, and to change gear (not illustrated). When engine brake is acting, the rotating torque transmitted form the first hub portion 10 in the order adverse to the aforesaid order causes the cushion plate 37 and facings 38 and 39 to rotate. The purpose of insertion of the friction plates 32 and 33 in this arrangement is to effect relative rotation between the flange portion 102 and the fixed plates 22 as well as the fixed plates 22 and the thrust plate 34/the ring-like plate 29 thereby to obtain the desired hysteresis, when the rotating torque is transmitted form the engine (or the transmission) to the facings 38 and 39 (or the first hub portion 10).

FIG. 4 is a sectional view taken along the line IV—IV of FIG. 1, and shows the cross-sectional shape of the intermediate member 13. Alternative forms of this member 13 are shown in FIGS. 5a–5h. According to FIG. 5a, an intermediate member 13a is formed by reversal of the intermediate member 13 of FIG. 4, and has therein a groove 131a similar to the groove 131 as shown in FIG. 4. FIG. 5b shows another embodiment according to which the second hub portion 11 is provided therein with a groove 11b, and an intermediate member 13b is provided with a projection 131b to engage with said groove 11b. This embodiment is advantageous in view of wear, since the intermediate member 13b comes in surface contact with the first hub portion 10 at a reduced contact pressure.

FIG. 5c illustrates a further embodiment wherein an intermediate member 13c of a circular cross-section is fitted into a groove 11c formed in the second hub portion 11. In this embodiment, the surface of the member 13c comes into linear contact with the first hub portion 10 with a small or reduced frictional force.

FIG. 5d illustrates a still further embodiment in which an intermediate member 13d of a thin plate is disposed between both hubs 10 and 11. According to this embodiment, a lubricant layer such as a molybdenum disulfide layer may be provided in lieu of that member 13d. FIG. 5e illustrates a modified member 13e of the intermediate member 13a of FIG. 5a, FIGS. 5f and 5g show intermediate members 13f and 13g of a rectangular cross-section. Finally, FIG. 5h shows an intermediate member 13h of a circular cross-section as contemplated in FIG. 5c, which is similar in the effect and action with that of FIG. 5c. The embodiments of FIGS. 5g and 5h are characterized by resisting to both or either one of the external forces acting in the directions shown by arrows A and B.

Thus, FIGS. 5a–5h show the modified forms of the intermediate member 13 of FIG. 4, which, as a matter of course, can hold for the intermediate member 12.

FIG. 6 shows that the spring 25 and the associated seat 25, functioning together as a damper, may be located at varies posistions and modes. Namely, both members 24 and 25 are not necessarily mounted only within the outer periphery of the first hub portion 10. The damper members may thus be disposed between the outer periphery of the first hub portion 10 and the inner periphery of the second hub portion 11, say, mounted to extend from the first hub portion 10 and terminate at the second hub portion 11. It is then understood that the intermediate member 13 is in a divided state. The window 107, 108 for receiving the spring 25 as shown in FIG. 1 now assume a modified mode wherein the window is composed of a pair of associated notches 107a and 107b provided between or extending over the first and second hub portions 10 and 11.

2ND EMBODIMENT

The second embodiment of the present invention will now be explained hereinbelow.

This embodiment provides a clutch disc of the type mentioned in "Summary of the Disclosure", which is characterized in that a friction element (third friction means) and a control plate are disposed between a fixed plate and a disc plate, a control plate being adapted to define the point of commencement of action of said third friction means;

a resilient control means for controling the angular position of said contrtol plate;

said control plate being capable of engaging at its outer periphery said outer flange portion with a given angular clearance $\alpha$, and circumferentially engaging said resilient control means adapted to engage circumferentially within a window/notch provided in said disc plate and to loosely and circumferentially fit in an associated window/notch provided in said outer flange portion with an angular clearance $\alpha$ corresponding to said given angular clearance.

With this arrangement, it is possible to determine at discretion the point of commencement of action of the particular friction element by the control plate through the setting-up of the given angular clearance $\alpha$.

On the basis of the aforesaid characteristic feature the inner flange portion is joined integrally to the outer flange portion to form a first torque transmition stage. Thereafter, when the thus integrated flange portions is rotated (i.e., angularly displaced) by a given angle relative to the disc plate, if required, through second and further intermediate stages, the control plate as in the embodiment abuts at its periphery (a pin in the embodiment as shown) upon the side edge of a notch formed in the periphery of the outer flange. The point of this abutment is the point of commencement of action of the friction element disposed between the control plate and the disc plate. It is here noted that the intermediate stages are preferably at least one, but may be omitted in some cases.

Relative rotation then takes place between the disc plate and the control plate as a result of compression of the control spring fitted into the window/notch in the disc plate, within which the control plate engages thereafter. Consequently, the friction element clamped under pressure between both plates functions to define the given width H of hysteresis.

It is possible to predetermine an angular clearance $\alpha$ ($\beta$ for the opposite direction) between the side wall of the notch formed in the periphery of the outer flange and the periphery of the control plate and, hence, to predetermine the point of commencement of action of the friction element, thereby obtaining the required frictional force or the required hysteresis width.

This control plate may be applied on both sides (preferably) or one side of the inner flange. In the former case, a pair of control plates are fixed to each other by means of pins loosely arranged in the notches formed in the outer flange portion, as will be appreciated from the later description. It is possible to set the point of commencement of action within a wide range by placing the control spring in particular, exclusive window/notches (associated window/notches formed in the disc plate and the outer flange portion). The control spring may be housed in the central hollow space of one damping spring (of a larger diameter) loosely fitted in the outer flange portion. In this way, the objects of the present invention can be accomplished without provision of any particular window/notch. In this connection, it is possible to put the friction element into operation at any point before the point of commencement of action of the said damping spring by projecting the control spring beyond both ends of the damping spring. In an extremely particular case, the length between both ends of the control spring may be equal to that of the damping spring, so that the point of commencement of action of the friction element is in coincidence with the switching point in the torque curve (hence, the control spring may be omitted).

Figure 11:
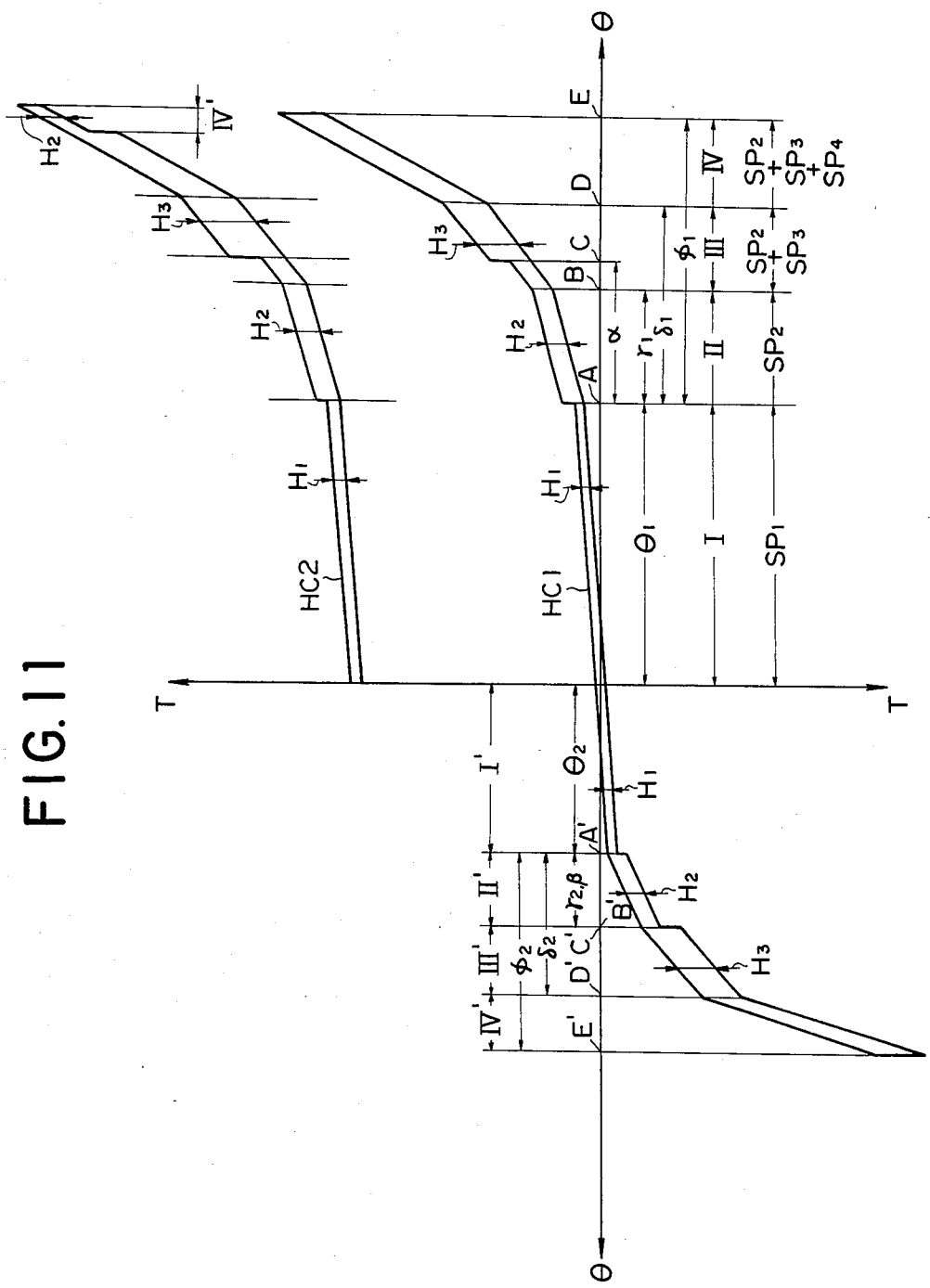
FIG. 11 is a graph showing the torsional characteristics of the clutch disc according to the present invention (the relationship between the angle of torsion and the torsional torque).

It is also understood that, when the control plate-control spring (resilient control means) is fitted in the window/notch in the disc plate in a circumferentially loose manner, there is obtained a sector of the hysteresis curve as shown by the curve sector HC2 indicated in the right upper part in FIG. 11.

With this arrangement, it is possible to set up any hystersis width from any desired point in order to reduce noises in a given range of running speed (or in a given stage of the torque transmitted).

It is also understood that the insertion of a thrust member between the fixed plate and the control plate is designed to set a suitable hysteresis width for effectively reducing primarily the differential tapping noise or the booming noise during low-speed running. According to this mode, it is possible to set up hysteresis width-variable sectors of at least three stages.

In cooperation with a pair of fixed plates clamping the divided hub flange portions, directed toward both sides, the thrust members, the control plate, the thrust member, a pressure plate, and at least one axial pressing means (leaf spring, etc) provided outside of the hub flange portions as well as a pair of the outermost disc plates serve to effectively prevent axial displacement of the hub flange portions thereby to assure stable operation of the clutch disc. Furthermore, the clutch disc is provided with the torque transmission sectors of four stages (three switching points of the gradient) and the hysteresis width variale sectors of three ranges. In this case, the friction element, the commencement of action of which is defined by the control plate, constitutes the third hysteresis width range.

In this connection, it is understood that according to the inventive arrangement, it is also possible to make the hysteresis width at a moderate torque stages larger than that at a high torque stage.

The second embodiment of the present invention will now be explained in more detail with reference to the accompanying drawings, this second embodiment being given only by way of example and without limitation.

Referring to FIGS. 7 to 10, a clutch disc 410 according to this embodiment mainly includes a central hub portion 412, a hub flange 414 extending radially therefrom, a pair of control plates 416 arranged concentrically with respect to the hub portion 412, and a pair of disc plates 418 (main- and sub-disc plates 418a and 418b) arranged concentrically with respect to the hub portion 412 and outside of the control plates 416.

As illustrated, the hub flange 414 comprises an inner flange portion 414a integral with the hub portion 412 and an outer flange portion 414b arranged around the periphery of the inner flange portion 414a in coaxial relation. The inner flange portion 414a includes a central disc portion 420 and two pairs of arms 422 disposed at the diametrical positions. The ends of these arms 422 and the outer surface of the disc portion 420 are in slidable contact with the inner surface of an inner (central) opening 414c of the outer flange. For this reason, the outer flange portion 414b is rotatable (angularly displaceable) relative to the inner flange portion 414a with its angle of rotation being limited by the angular clearance allowed between both flanges. In the drawings, the angle of rotation is defined in terms of $\theta_1$ and $\theta_2$. The outer flange portion 414b is a member of a substantial disc-like shape, and provided therearound with four notches 428 at equal intervals (to be explained hereinafter). Four windows 430-433 are provided in the portions of the outer flange portion between the notches 428 so as to receive four damping springs SP2-SP4.

Figure 9:
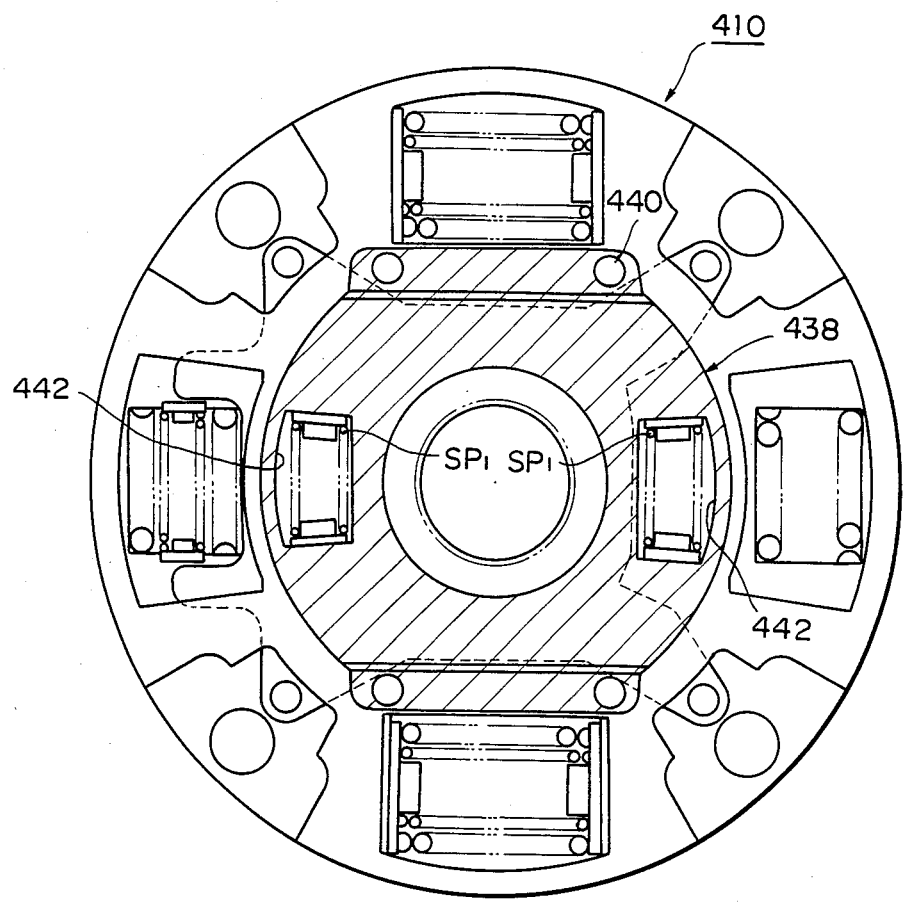
FIG. 9 is a partial front view of a fixed plate fitted in a clutch disc.
Figure 10:
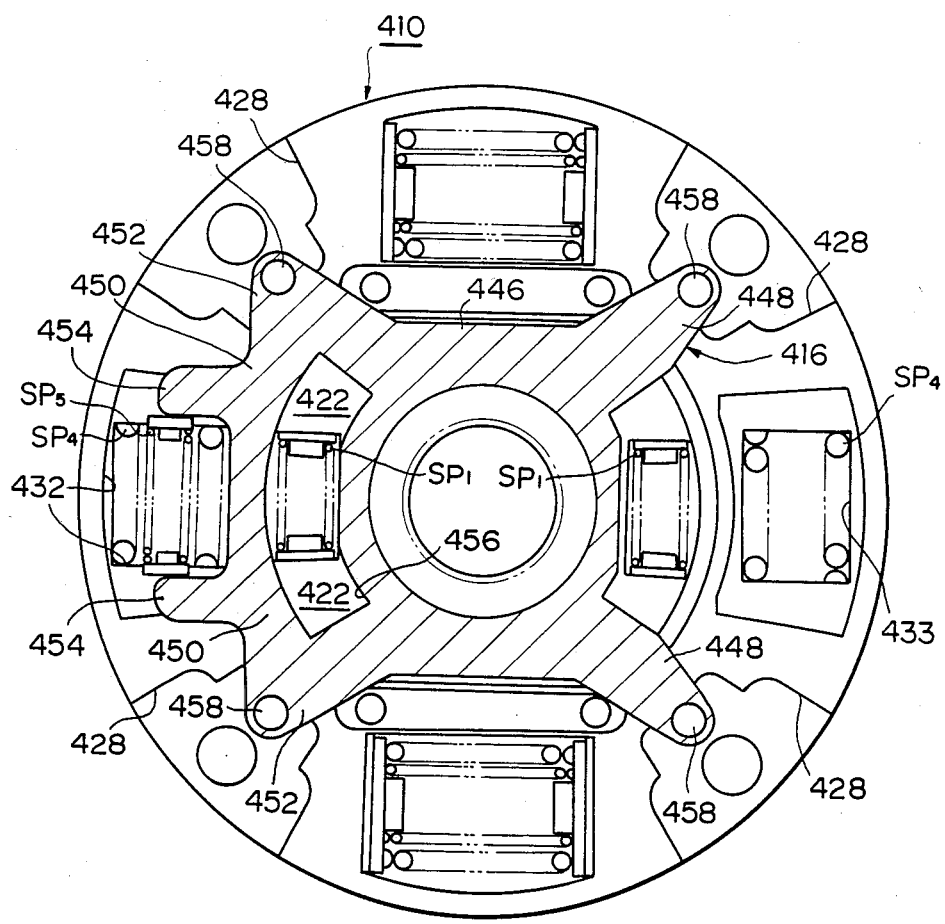
FIG. 10 is a partial front view of a control plate fitted in the clutch disc.

Fixed plates 438 are fixed on both sides of the inner flange portion 414a through first thrust linings 436 (first friction elements), said fixed plates being concentric with respect to the hub portion 412. As illustrated in FIG. 9, these fixed plates 438 are formed of a substantially annular member having a slightly larger outer diameter than the opening of the outer flange 414b, and secured at its periphery to the outer flange 414b by means of rivets 440. The fixed plate 438 is provided therein with a pair of window/notches 442 at the diametrical positions for receiving first damping springs SP1, said first damping springs being on the other hand retained between the arms 422 of the inner flange portion 414a through retainers 441.

Control plates 416 are disposed in concentric relation with respect to the hub portion 412 and outside of the fixed plates 438 through second thrust linings 444 (the second friction elements). Each control plate 416 comprises an annular portion 446 adjacent to the hub portion 412, a pair of projections 448 extending radially and outwardly from the outer flange portion 414b into the notches 428 in the outer flange 414b, and a substantially trapezoidal portion 450 extending from the annular portion 446 in the direction counter to the projections 448, as seen from FIG. 10. Like the projections 448, the shoulder ends 452 of the trapezoidal portion 450 are located within the notches 428 in the outer flange portion 414b. A pair of parallel arms 454 extend outwardly from the outer side of the trapezoidal portion 450, and the ends of the arms 454 being loosely mounted in the window/notch 432 in the outer flange 414b to retain a control spring SP5 controlling the control plate 416 in place, said control spring SP5 being housed in the hollow portion of the fourth damping spring SP4 with both its ends projecting from both ends of the fourth damping spring SP4, and said fourth damping spring SP4 being fitted in the disc plates 418a and b. Between both ends of the spring SP5 and the inner ends of the window/notch 432 in the outer flange portion 414b, there are provided with angular clearances $\alpha'$ and $\beta'$ corresponding to angular clearances $\alpha$ and $\beta$ allowed for the notches 428 to be discussed later. The control spring SP5 has a spring constant lower than that of SP4, so that the control plates can be held in a predetermined position even when the friction elements of low ranges work.

An arched slot 456 is formed in the trapezoidal portion 450 of the control plate 416 in order not to interrupt the movement of the first damper spring SP1, provided that such slot may assume other shapes if desired.

As seen from the drawings, the control plates 416 are symmetrical with respect to their horizontal center axes, but asymmetrical with respect to their vertical center axes. A pair of the control plates 416 are fixed together in place by means of pins 458 in a state where they are rotated by 180°. The pins 458 are then loosely fitted into the notches 428 in the outer flange 414b with angular clearances $\alpha$ and $\beta$. To put it in another way, the ends of the projections 448 and the shoulder ends 452 of the trapezoidal portion 450 of one control plate 418 are fixed to the shoulder ends 452 of the trapezoidal portion 450 and the ends of the projections 448 of the other control plate 418, respectively, by means of the pins 458.

Outside of these control plates 416, there are arranged third thrust linings 460 and annular pressure plates 462, and outside of the pressure plates 462, there are arranged the main- and sub-disc plates 418a and 418b, by which the control plates are urged in the axial direction with their annular portions 446 constituting friction surfaces with respect to the second and third thrust members 444 and 460.

Figure 7:
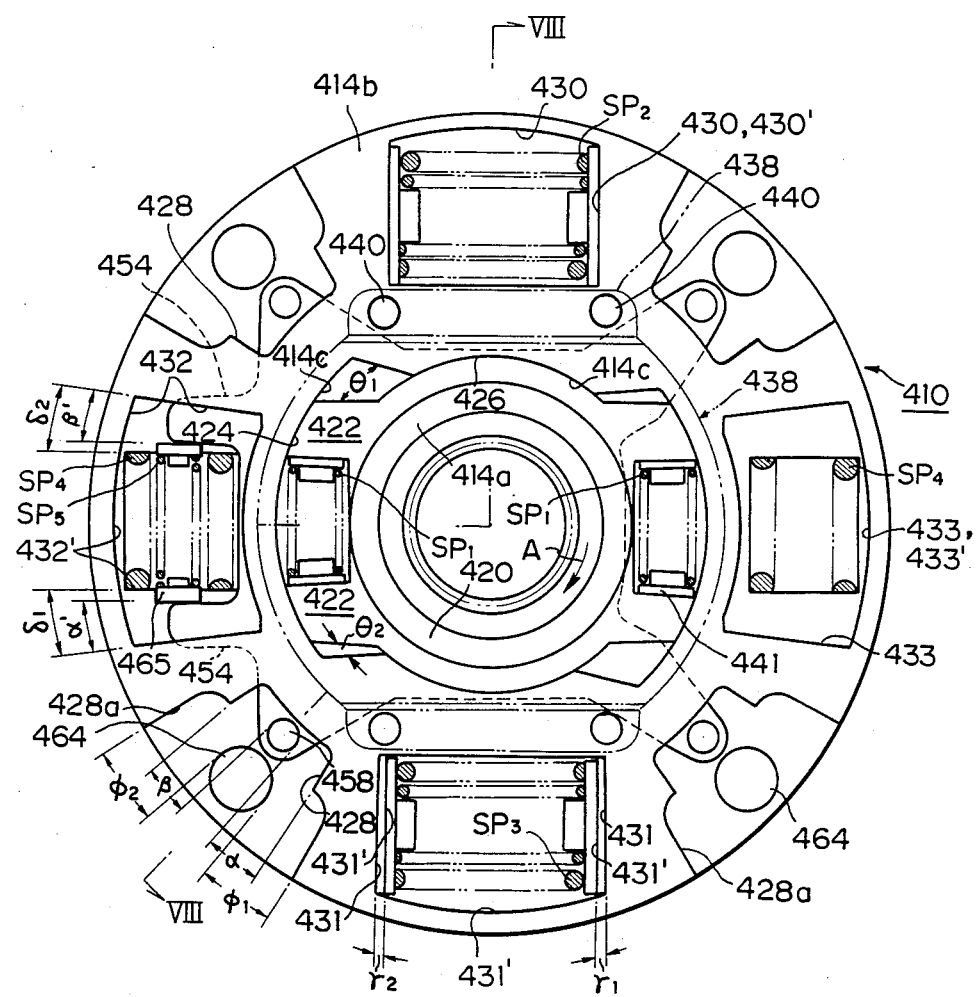
FIG. 7 shows a clutch disc according to another embodiment of the present invention, and is a partially sectional view taken along the line VII—VII of FIG. 8.
Figure 8:
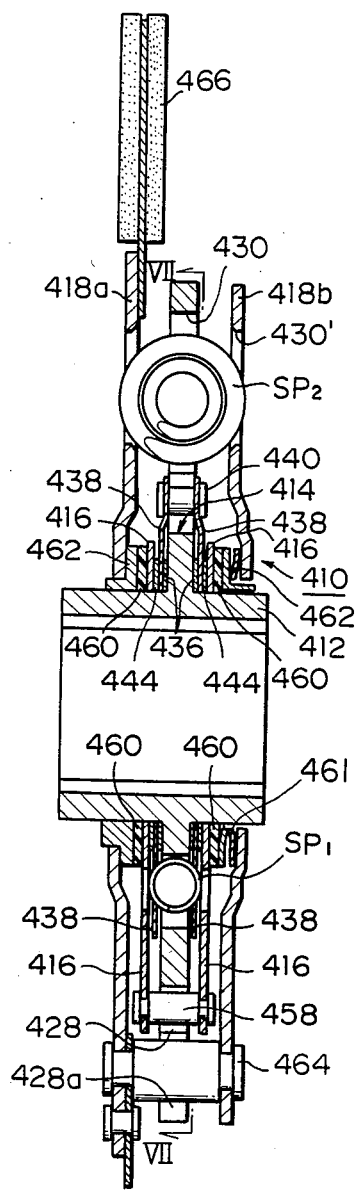
FIG. 8 is a sectional view taken along the line VIII—VIII of FIG. 7.

While FIG. 7 shows the control spring SP5 as being only disposed in one of the window/notches 433, it is understood that another spring SP5 may be disposed in the window/notch 433 that is at the diametrical position in considering the balance of rotation, if required: Possibly, one of the window/notches 432 (432') and 433 (433') may exclusively be used to receive the control spring SP5. It is further noted that the window/notch 432' or 433' in the disc plate 418 is provided at its inner ends with retainer portions for the control spring SP5, and that, in the example of FIG. 7, retainers 465 for the damping spring SP4 are provided with recesses at the centers of both its end faces to act as retainers 465 for the control spring SP5. The control spring SP5 is provided to enable the control plate arms 454 to hold at their neutral position. Since it suffices if a sufficient biasing force is produced by the control spring SP5, it is possible to use a spring having a lower spring constant without giving rise to adverse influences upon the torsional torque characteristics of the clutch disc.

Turning now to FIG. 11, hysteresis HC2 indicated by the range IV' of the hysteresis curve HC2 is defined by a clearance between the arms 454 and the damping spring SP4.

The main- and sub-disc plates 418a and 418b extend substantially in parallel with each other, and terminate on both sides of inner and outer flange portions 418a and 418b. The sub-disc plate 418b is of a slightly smaller diameter, and integrally joined on its peripery to the main disc plate by axial insertion of stopper pins 464 of an enlarged diameter at the middle portion throughout the notches 428 in the outer flange portion 414b, said stopper pins also serving as spacer pins. The stopper pin 464 is loosely arranged within the notch 428 with given clearances $\phi_1$ and $\phi_2$ with respect to its side ends 428a, and capable of engaging the side ends 428a after relative rotation of the outer flange portion 414b and the disc plate 418. These disc plates 418a and 418b are provided therein with window/notches 430'-433' corresponding to the window/notches 430-433 in the outer flange 414b, into which the damping springs are fitted without any circumferential clearance (the second damping spring SP2 for 430', the third damping spring SP3, for 431' and the fourth damping spring SP4 for 432' and 433'. The disc plates 418a and 418b receive a rotational torque from the outer flange portion 414b via the springs SP2-SP4, which are put into action in succession following the relative rotation occurring between the disc plate 418 and the outer flange portion 414b owing to the presence of the clearances allowed between the window/notches 430'-433' in the disc plate and those 430-433 in the outer flange portion (corresponding to angles $\gamma_1$, $\gamma_2$ and $\delta_1$, $\delta_2$ in the drawings).

While the illustrated embodiment has been described as making larger the window/notches 430-433 in the outer flange portion 414b to allow clearances, it is understood that the window/notches 430'-433' in the disc plate may be made larger to allow the clearances, and the damping springs SP2-4 may be fitted into the window/notches in the outer flange portion 414b. The main disc plate 418a is provided therearound with a facing 466 to effect the transmission of torque between it and an associated follow-up friction member (not illustrated).

Reference will be made to the operation of the foregoing embodiment on condition that, for the convenience of illustration, the central hub portion 412 is fitted into a key or spline (not shown) formed in a driving shaft (not shown), and rotated in the direction indicated by an arrow in FIG. 7.

When the inner flange 414a rotates in the direction indicated by the arrow, a rotating torque is resiliently transmitted to the fixed plates 438 or the outer flange portion 414b through the first damping springs SP1 having a relatively low spring constant, which are fitted under pre-stress in between the flange arms 442 and within the window/notches 442 in the fixed plates 438. The rotating torque is then damped by the compression of the first damping springs SP1 and the first thrust linings 436 are subjected to moderate frictional movement on their both sides, so that the fixed plates 438 or the outer flange 414b shifts slightly in the rotational direction.

With the angle of torsion $\theta_1$ (corresponding to I in FIG. 11) corresponding to the angular clearance between the inner flange portion 414a and the outer flange portion 414b, the transmission of torque and the frictional movement as mentioned above are effected. After the arms 422 of the inner flange portion 414a take abutment onto the inner periphery of the outer flange portion 414b. The gradient of the angle of torsion-torque curve within the stage I in FIG. 11 is substantially determined depending upon the spring constant of the first damping springs SP1, while the width H1 of hysteresis is determined depending upon the frictional resistance of the first thrust linings.

After the relative angle of torsion between the inner flange portion 414a and the fixed plates 438 reaches $\theta_1$ and the arms 422 abut onto the outer flange portion 414b (as shown by the point A in FIG. 11), the inner flange portion 414a rotates in unison with the outer flange portion 414b. Consequently, later transmission of torque between the outer flange portion 414b and the disc plates 418a/418b is caused through the second damping spring SP2 fitted, without any clearance, into both window/notches 430 in the outer flange portion 414b and in the main- and sub-disc plates 418a/418b, respectively, so that the second thrust linings 444 clamped between the fixed plates 438 and the control plates 416 move frictionally. The relative angle of torsion (the stage II in FIG. 11) is determined, in the meantime, depending upon the clearance $\gamma_1$ between the window/notch 431 in the outer flange portion 414b and the window/notch 418 in the disc plate 418.

The width H2 of hysteresis is also then determined by the frictional resistance of the second thrust linings 444, and the width H2 of the histeresis continues within the limits of an angle of $\alpha$ given independently of the angle of torsion.

When the outer flange 414b rotates by an angle of $\gamma_1$ with respect to the disc plate 418 after the integration (the point A in FIG. 7) of the inner flange portion with the outer flange portion is achieved as mentioned above, the clearance (corresponding to $\gamma_1$ in FIG. 7) in the window/notch 431 is eliminated, so that the third damping spring SP3 works further. As a result, later transmission of torque in a region belonging to the stage II defined between the points B and C in FIG. 11 is caused through the second and third damping springs SP2 and SP3. For this reason, the gradient of the torque curve within the stage III in FIG. 11 is determined by a sum of the spring constants of the second and third damping springs SP2 and SP3. Then, if $\alpha > \gamma_1$ the width of hysteresis (H2) is determined depending upon the second thrust linings, as seen from FIG. 11.

Where $\alpha > \gamma_1$, the disc plates 418 rotates further so that its torsion relative to the outer flange 414b proceeds to the point C in FIG. 11 (the total angle of torsion relative to the inner flange 414a equals $\theta_1$ plus $\alpha$). In the meantime, the control plates 416 rotates in operative association with the disc plate 418 through the control springs SP5 clamped between both their arms 454. Then, there is frictional movement of the second thrust linings between the control plates 416 and the fixed plates 438; however, there is no frictional movement of the third thrust linings between the control plates 416 and the fixed plates 418. The control plates 416 are then permitted to rotate within the limits of the angular clearance $\alpha$ between the window/notches 428 in the outer flange portion 414b and the pins 458 for joining together both control plates 416. This angular clearance α defines an angle of α between the point A and C in FIG. 11, the latter α being made larger or smaller than γ₁ independently thereof.

When the angle of torsion between the members 414b–418 (hence 416) reaches α, the pins 58 abut onto one side ends of the notches 428. Subsequently, the control plates 416 rotate with the outer flange portion 414b; however, its rotation is limited to one direction thereby. On the other hand, the torsion between the members 414b–418 in association with the compression of the third damping spring SP3 proceeds and reaches the point D in FIG. 11. This results in relative rotation between the control plate 416 and the disc plate 418a or 418b clamping the third lining 460 form both its sides through the keep plates 462, thus giving rise to the third frictional force which then defines the hysteresis H3. The magnitude of this hysteresis H3 can be set up through the design of the third thrust linings independently of the hysteresis H2, and the point of commencement of action thereof can be done apart from the switching points (B, D. etc.) on the torque transmission curve as well (through the setting-up of α). In other words, the magnitude of the intermediate hysteresis H2 can be set up independently of the final hysteresis H3 with its terminal point or its transition point to H3 being set up independently of the switching points on the torque transmission curve.

The angle alpha (α) may be set up in various manners. In the foregoing embodiment where α>γ₁, the control plates 416 are designed to function to vary the hysteresis width after the actuation of the third damping spring (after the point B). However, if the angle α is equal to the angle γ₁ corresponding to the clearance allowed for the window notch 431 (if α=γ₁), then the point of commencement of action of the control plates, i.e., the point C of hyteresis change, is in coincidence with the switching point B on the torque transmission curve. If α<γ₁, then the point C of a change in the hysteresis width proceed the switching point B on the torque transmission curve.rrrrr Further proceeding of torsion causes that the fixed pins 458 for the control plates 416 take abutment onto the side ends 428 of the notches 428 in the outer flange portion 414b, so that the control plates rotate in unison with the outer flange portion. When they rotate by the angle δ₁ (now assume δ₁>α) corresponding to the clearances allowed for the window/notches 432 and 433 into which the fourth damping springs SP4 are fitted, the fourth damping spring SP4 fitted in between the arms 422 of the control plates 416 is additionally actuated and acts upon the disc plate 418. In this way, the rotational torque is transmitted from the outer flange portion 414b to the disc plate 418 through all the second-fourth damping springs SP2-SP4. Thus, the torque rises sharply from the switching point D, as shown the stage IV in FIG. 11.

Thereafter, the outer flange portion 414b rotates relative to the disc plate further in operative association with the compression of the spring SP4. Still further rotation of the outer flange portion causes that the stopper pins 464 for the disc plate 418 take abutment onto the side ends of the notches 428 in the outer flange portion 428 (corresponding to the point E in FIG. 11). From now on, the disc plate 418 rotates in unison with the outer flange portion 414b.

While reference has been made to the case where the inner flange portion 414a rotates clockwise, parallel reference holds for the case where it rotates counterclockwise. However, since the switching points A, B, D and E on the torque transmission curve and the point C of hysteresis change are determined depending upon the magnitude of the respective clearances ($\theta_2$, $\gamma_2$, $\delta_2$, $\beta$), the switching points on torque and the point of hysteresis change can be set up in such a manner that they are distinct from the curve HC1 given in the right half of FIG. 11. For instance, if the angle $\beta$ coincides with $\gamma_2$, then the switching point B' is in agreement with the point C' of hysteresis change (see the left half of FIG. 11).

As shown in FIG. 11, the width H1-H3 of hysteresis increases gradually, but may be increased or decreased by variation of the effective diameter and material of the thrust linings.

While the control plates 416 have been described as being asymmetrical with respect to their vertical center axes, it may be possible to use a single control plate including the trapezoidal portion 450 and the arms 454 on the left and right sides. In this case, the single control plate 416 may be arranged on the hub portion 412 and the pin 458 may be replaced by a projection or a bent portin formed on the control plate.

What is claimed is:

1. In a clutch disc in which a clutch hub having a hub flange comes into rotating engagement with a disc plate through damping means and friction means, a clutch disc including:

said hub flange comprising an inner flange portion and an outer flange portion mounted to be relatively rotatable by a given angle with respect to said inner flange portion and with an angular clearance;

at least one plate fixed to said outer flange portion so as to limit the axial relative movement between said inner and outer flange portions;

first damping means arranged operatively between said inner and outer flange portions through said fixed plate and designed to be resiliently compressed during relative angular displacement between said inner and outer flange portions;

a first friction means disposed between said fixed plate and one of said inner and outer flange portions operatively associated with said inner and outer flange portions;

at least one disc plate adapted to be relatively rotatable with respect to said outer flange portion and provided with a facing member on the disc plate outer periphery;

second and third damping means arranged operatively between said disc plate and said outer flange portion, said second and third damping means being designed to be resiliently compressed during relative angular displacement between said disc plate and said outer flange portion;

second and third friction means arranged between said fixed plate and said disc plate and acting between said outer flange portion and said disc plate;

a control plate interposed between said fixed plate and said disc plate for determination of a point of commencement of action of said third friction means; and a resilient control means disposed to control the angular position of said control plate relative to said outer flange portion so as to maintain a predetermined angular position of said control plate relative to said outer flange portion during a predetermined relative rotation angle ($\alpha$) between said outer and inner flange portions;

said resilient control means being constructed and disposed so that it takes substantially no part in torque transmittance; and an outer periphery of said control plate being capable of engaging its said outer flange portion with a given angular clearance corresponding to said predetermined angle ($\alpha$), and circumferentially engaging said resilient control means adapted to engage circumferentially within a window provided in said disc plate and to loosely and circumferentially fit in an associated window provided in said outer flange portion with an angular clearance corresponding to said predetermined angle ($\alpha$).

2. A clutch disc as defined in claim 1, in which said control plate is clamped under pressure by said second and third friction means arranged therebetween.

3. A clutch disc as defined in claim 1, in which said resilient control means is arranged in associated window/notches provided in said outer flange portion and said disc plate.

4. A clutch disc as defined in claim 3, in which said resilient control means is arranged whthin a central hollow space of any one of said damping means arranged between said outer flange portion and said disc plate.

5. A clutch disc as defined in claim 3, in which said resilient control means is arranged in a window/notch provided in said disc plate with an angular clearance.

6. A clutch disc as defined in claim 1, in which the angular clearance ($\alpha$) between said control plate and said outer flange portion is defined through engagement between said control plate and a notch provided in said outer flange portion.

7. A clutch disc as defined in claim 1, in which said control plate has at least one pair of arms therebetween receiving said resilient control means.

8. A clutch disc as defined in claim 7, in which said arms are circumferentially engageable with the third damping means with an angular clearance.

9. In a clutch disc in which a clutch hub having a hub flange comes into rotating engagement with a disc plate through damping means and friction means, a clutch disc including:

said hub flange comprising an inner flange portion, and an outer flange portion mounted to be relatively rotatable by a given angle with respect to said inner flange portion and with an angular clearance;

at least one plate fixed to said outer flange portion so as to limit axial relative movement between said inner and outer flange portions;

first damping means arranged operatively between said inner and outer flange portions through said fixed plate and designed to be resiliently compressed during relative angular displacement between said inner and outer flange portions;

a first friction means disposed between said fixed plate and one of said inner and outer flange portions operatively associated with said inner and outer flange portions;

at least one disc plate adapted to be relatively rotatable with respect to said outer flange portion and with a facing member on the outer periphery;

second and third damping means arranged operatively between said disc plate and said outer flange portion, said second and third damping means being designed to be resiliently compressed during relative angular displacement between said disc plate and said outer flange portion;

second and third friction means arranged between said fixed plate and said disc plate and acting between said outer flange portion and said disc plate; and a control plate interposed between said fixed plate and disc plate for determination of a point of commencement of action of said third friction means;

said control plate being capable of engaging at its outer periphery said outer flange portion with a given angular clearance ($\alpha$), and circumferentially engaging said third damping means adapted to engage circumferentially within a window/notch provided in said disc plate and to loosely and circumferentially fit in an associated window/notch provided in said outer flange portion with an angular clearance corresponding to said given angular clearance ($\alpha$).

10. A clutch disc as defined in claim 9, in which said control plate is clamped under pressure by said second and third frictionn means.

11. A clutch disc as defined in claim 9, in which the angular clearance ($\alpha$) between said control plate and said outer flange portion is defined through engagement between said control plate and a notch provided in said outer flange portion.

12. A clutch disc as defined in claim 9, in which said control plate has at least one pair of arms therebetween receiving the third damping means.

13. A clutch disc as defined in claim 12, in which said arms are circumferentially engageable with the third damping means with an angular clearance.

* * * * *